US010274589B2

(12) United States Patent
Kiehn et al.

(10) Patent No.: US 10,274,589 B2
(45) Date of Patent: Apr. 30, 2019

(54) METHOD AND DEVICE FOR OPTICALLY MEASURING DISTANCES

(71) Applicant: Ibeo Automotive Systems GmbH, Hamburg (DE)

(72) Inventors: Michael Kiehn, Hamburg (DE); Michael Köhler, Hamburg (DE); Olaf Schubert, Ingolstadt (DE); Hans-Martin Kroll, Ingolstadt (DE)

(73) Assignee: Ibeo Automotive Systems GmbH, Hamburg (DE)

( * ) Notice: Subject to any disclaimer, the term of this patent is extended or adjusted under 35 U.S.C. 154(b) by 0 days.

(21) Appl. No.: 15/922,764

(22) Filed: Mar. 15, 2018

(65) Prior Publication Data
US 2018/0203099 A1    Jul. 19, 2018

Related U.S. Application Data

(63) Continuation of application No. PCT/EP2016/071307, filed on Sep. 9, 2016.

(30) Foreign Application Priority Data

Sep. 16, 2015  (EP) .................................... 15185488

(51) Int. Cl.
*G01S 7/48* (2006.01)
*G01S 7/484* (2006.01)
*G01S 17/10* (2006.01)
*G01S 17/42* (2006.01)
*G01S 17/93* (2006.01)
*G01S 7/487* (2006.01)
*G01S 7/495* (2006.01)

(52) U.S. Cl.
CPC .............. *G01S 7/484* (2013.01); *G01S 7/487* (2013.01); *G01S 7/495* (2013.01); *G01S 17/10* (2013.01); *G01S 17/42* (2013.01); *G01S 17/936* (2013.01); *G01S 7/4876* (2013.01)

(58) Field of Classification Search
CPC ....................................................... G01C 3/08
See application file for complete search history.

(56) References Cited

U.S. PATENT DOCUMENTS

| 3,900,261 | A |   | 8/1975  | Wingate  |            |
|-----------|----|---|---------|----------|------------|
| 7,405,812 | B1 | * | 7/2008  | Bamji    | G01S 13/325 |
|           |    |   |         |          | 356/5.1    |
| 2012/0257186 | A1 | * | 10/2012 | Rieger | G01S 7/487 |
|           |    |   |         |          | 356/5.01   |
| 2015/0015868 | A1 | * | 1/2015  | Jachman | G01C 3/08  |
|           |    |   |         |          | 356/5.01   |

FOREIGN PATENT DOCUMENTS

EP      2889642 A1      7/2015

OTHER PUBLICATIONS

International Search Report with Written Opinion dated Nov. 14, 2016, for corresponding international application PCT/EP2016071307.

* cited by examiner

*Primary Examiner* — Luke D Ratcliffe
(74) *Attorney, Agent, or Firm* — Myers Wolin, LLC

(57) ABSTRACT

In order to improve the failure proneness of methods or devices for optically measuring distances, it is proposed that the measurement pulses for measuring distances are sent out aperiodically.

12 Claims, 2 Drawing Sheets

METHOD AND DEVICE FOR OPTICALLY MEASURING DISTANCES

CROSS-REFERENCE TO RELATED APPLICATIONS

This application is a continuation application under 35 USC 120 from International Application PCT/EP2016/071307, filed Sep. 9, 2016, which claims priority from European Patent Application 15185488.2, filed Sep. 16, 2015, the contents of each of which are incorporated herein by reference.

TECHNICAL FIELD

The invention relates to a method for optically measuring distances and a device for optically measuring distances.

PRIOR ART

Optically active distance measurements to so-called targets, in particular for application in the driverless navigation of vehicles, are based on the time of flight principle. In most cases, a scanning sensor, preferably LIDAR sensor (abbreviation for "Light detection and ranging") sensor is used which periodically sends out pulses. The pulses are reflected differently from the surfaces of solids, dust and gases, wherein the reflected pulses are detected in the direction of the sensor. From the determination of the transit time of the pulses from the sensor to objects and back, it is possible to determine the distance to these objects with the aid of the speed of light.

A disadvantage of systems known from the prior art is the strict periodicity of the sent-out pulses. As a result of the fact that the pulses are sent out periodically, it is possible for example that the periodicity thereof is identified by measurement technology by an interferer and light pulses having approximately the same periodicity suitable for interference are intentionally sent in the detection range of the LIDAR sensor in the direction thereof. Thus, false detections could occur deterministically which appreciably interfere with the measurement of distances to a target. Furthermore, non-intentionally placed interference sources which primarily generate a periodic interference signal and make it difficult to detect the pulses sent out for the measurement can also occur. The non-intentionally placed interference sources are random sources due to ambient conditions. The reason for the failure proneness of the known systems for measuring distances is that the systems cannot distinguish interference pulses, in particular periodic interference pulses, from their own sent-out measurement pulses for measuring distances and therefore incorrectly include signals from interference sources in the distance measurement. Measurements on non-existing targets, so-called measuring errors, are the result. Scanning LIDAR sensors having a rotating pulse deflecting unit, for example a rotating mirror or a rotating sensor head, which deflects the pulses prior to sending out for measuring distances in various directions, i.e. at various angles to a sensor plane, also cannot solve the problem indicated above. Known pulse deflecting units are operated at a constant rotation frequency and the sending out of transmission pulses as well as the measurement of the transit times of the reflected echoes of the pulses take place at certain angles. In this embodiment, the principle of the measurement method can also be simply understood by interferers and is therefore also prone to intentional or unintentional interferences.

Specifically in the area of autonomous driving, i.e. driverless navigation of a vehicle, such a lack of robustness towards specifically introduced or unintentionally present interference sources is not acceptable, in particular from safety aspects.

DESCRIPTION OF THE INVENTION: OBJECT, SOLUTION, ADVANTAGES

It is basically the object of the invention to improve a method for measuring distances in such a manner that the failure proneness with respect to interference pulses is reduced appreciably. It is further the object to further develop a device for measuring distances in such a manner that this is configured robustly with respect to interference pulses.

The aforesaid object is solved by a method for optically measuring distances, wherein a plurality of measurement pulses is emitted and sent out aperiodically by means of a pulse-generating unit. At least one sent-out measurement pulse is reflected by one or preferably a plurality of targets in the form of a reflected measurement pulse, wherein a detector detects the measurement pulse reflected by the target to the detector.

The transit time of the measurement pulse to the target is determined, wherein the distance covered by the measurement pulse to the target is determined with the aid of the speed of light. More precisely, the transit time of the measurement pulse to the target and back is measured, wherein the transit time of the measurement pulse to the target is determined from this by division by the divisor two. A target comprises a measurement object.

An optical distance measurement is characterized in that distances are determined by using optical signals, in particular optical measurement pulses. The term "distance" is to be understood as a distance. The distance covered by the measurement pulse is to be understood as the distance between pulse generating unit and target plus the distance between target and detector, or the sum of the distances between the pulse generating unit and the target and between the target and the detector. Since the target is typically a three-dimensional body, some regions of the target can be arranged closer and other regions of the target can be arranged further away. The term "distance to the target" means the distance to at least one point of the target and specifically to the point on which a measurement pulse has impinged and at which this was reflected. The transit time is to be understood as the time taken by the measurement pulse for the said distance.

A pulse is an optical, in particular electromagnetic signal. Preferably a pulse has a pulse duration. Thus, a pulse can be understood as a time-limited portion of electromagnetic radiation. In this context, the pulse duration is the temporal width of the pulse, i.e. the time interval between the beginning and the end of a pulse. The pulses which are emitted for measuring distances and which are preferably reflected by the target are designated as measurement pulses. Since a pulse is an electromagnetic signal and therefore the speed of the pulse is known, it can be concluded from the transit time of a measurement pulse with the aid of the speed of light what distance the measurement pulse has covered in the transit time. In particular, a measurement pulse is a laser pulse so that the pulse generating unit primarily comprises a laser, in particular a pulsed laser. Advantageously the pulse generating unit comprises a laser diode. Preferably the pulse generating unit consists of a laser. Furthermore, the pulse generating unit can preferably comprise a plurality of lasers.

The measurement pulse is advantageously a light pulse, i.e. a pulse having a wavelength from the part of the electromagnetic spectrum invisible to the human eye.

In particular, the method comprises allowance for the precise position of the pulse generating unit and the detector, in particular in relation to one another. Consequently, with the aid of this information the distance of the pulse generating unit to the target and/or the distance of the detector to the target can be concluded from the transit time of the measurement pulse from the pulse generating unit via the target to the detector. The method further comprises in particular the arrangement of the pulse generating unit and the detector in a device for optically measuring distances and a use of this for measuring distances. As a result of the known arrangement with respect to one another of the pulse generating unit and the detector inside a device for optically measuring distances, the distance from the device to a target can be determined.

The method preferably comprises a method for navigation of a vehicle, in particular an automobile, wherein the vehicle is in particular controlled autonomously, i.e. a driverless advancement of the vehicle is made possible by means of the navigation. The term "target" can be understood as markings arranged specifically for navigation of the vehicle and preferably used for this purpose. In addition, targets can be ambient features which are located in the surroundings of the vehicle and whose positions are used for navigation of the vehicle. This includes, for example, trees, kerbs, lane markings or other stationary or moving road users. In such a case, typically no markings arranged additionally, specifically and exclusively for navigation, are used for navigation.

The pulse generating unit generates and emits a plurality of measurement pulses. In order that the distance to the target can be determined, the emitted measurement pulses for measuring distance are sent out, wherein at least one measurement pulse must be reflected at the target. The measurement pulse sent out previously in a certain direction returns in the opposite direction due to reflection at the target. The other measurement pulses not reflected at the target can, for example, be reflected at other targets or cover such a wide distance before they impinge upon the target that their reflection is no longer perceived by the detector. In particular, the method is suitable for determining the distance to several targets, in particular all the targets in the immediate surroundings of a device for measuring distance.

The measurement pulse reflected by the target is a measurement pulse which was sent out previously but has now changed its direction of propagation. The reflected measurement pulse can thus be understood as an echo of the sent-out measurement pulse. The present invention designates a measurement pulse which is sent out for the measurement as a sent-out measurement pulse, in particular after this has already been emitted by a pulse generating unit and preferably deflected by means of a pulse deflecting unit, whilst the measurement pulse reflected by the target is entitled as reflected measurement pulse although it naturally comprises the same measurement pulse at different times.

According to the invention, the measurement pulses are sent out aperiodically for measuring distances. This means that the sending out does not take place periodically, i.e. not in a temporally fixed scheme. Sent-out consecutive measurement pulses, more precisely their sending-out times, therefore have a different time interval with respect to one another. The term "sending out" preferably means the final sending out for measuring distance so that the method does not comprise any further deflection of the measurement pulses. If the method uses a device for measuring distances, the sent-out measurement pulses do not contact any further optics for beam guidance after they are sent out. In particular, the sending out for measuring distances can be understood as leaving the device. This definition allows an aperiodicity to be brought about in different ways, in different steps of the method as long as the final sending out is aperiodic. Preferably the measurement pulses are sent out in the direction of the target, in particular after the measurement pulses have already been emitted by a pulse generating unit and after they have preferably been deflected by means of a pulse deflecting unit.

Emitted measurement pulses therefore do not comprise sent-out measurement pulses. Emitted measurement pulses have certainly already left the pulse generating unit but in the sense of the invention are not yet finally sent out for measuring distances. For example, measurement pulses can be emitted by the pulse generating unit before they are finally deflected at a pulse deflecting unit and thus sent out. However, the pulses generated directly by the pulse generating unit can also be sent out for measuring distances without a further deflection. In this case, the generated pulses are emitted and sent out by the pulse generating unit.

The aperiodicity of the sending out of the measurement pulses is used for greater robustness with respect to interference pulses. Interference pulses are characterized in that their portion of electromagnetic radiation does not originally come from the pulse generating unit. Interference pulses are not used for measuring distances and therefore are not measurement pulses. Interference pulses are rather sent out by other generating units, here designated as interference sources. In particular, the interference pulses comprise interference light. In particular, the measurement pulses are sent out aperiodically into the surroundings of a device for measuring distance.

If the pulses are sent out periodically on the other hand, a method for measuring distances is fundamentally prone to failure. This is because the characteristic values of the method, for example, the repetition rate can be determined very easily from outside so that specific interference signals can be sent out by an interferer which result in measurement errors. When measurement pulses are sent out periodically, the pulse sequence can be assigned a pulse frequency which reciprocally specifies the time interval in which the measurement pulses follow one another. The frequency should not be confused with the frequency of the basic electromagnetic signal of the pulses which characterizes a pulse per se but is not related to the pulse sequence. Interference pulses can therefore intentionally be synchronized to the frequency of the periodic measurement pulses. Even if no intentional interference takes place, non-specifically placed interference sources can result in measurement errors since interference sources of this type can send periodic signals.

Since despite the aperiodicity, the actual sending-out times within the device are known, in the method according to the invention, a periodic interference pulse source from the point of view of the detector or a device for measuring distances generates uncorrelated noise relative to the measurement pulses actually used for measuring distances since the input of the periodic interference pulses can be related to the aperiodically sent-out out own measurement pulses.

Advantageously measurement pulses are sent out at different angles, wherein detected pulses are also received from different angles. The term "angle" primarily means solid angle. The angle specifies the precise direction in which the measurement pulse is sent out and/or received, for example, in relation to the housing of a device for measuring distances. As a result of the sending out at different angles, the measurement pulses are sent out in different directions. Likewise reflected measurement pulses are received from different angles, or from different directions. On the basis of measurement data from different angles, not only a distance of an impact point of a single measurement pulse on the target and therefore the distance to only one point of the target can be determined, but it is possible to determine the distances to different points of the target. Thus, locally related measurements are possible which allow the contour of the target to be determined. In particular, the angles preferably only differ slightly from one another so that a fine-mesh scanning of the surroundings and therefore scanning is possible.

In particular, the method comprises the use of a device for optical active measurement of distances wherein this preferably comprises a scanning device, in particular a scanning LIDAR sensor. The term "scanning" is to be understood as a scanning of at least one target, preferably the surroundings of the device. If measurement pulses are sent out periodically in a scanning method, it is possible that interference pulses can be matched to the corresponding frequency of the measurement pulse sequence so that detected interference pulses are incorrectly interpreted as measurement pulses in a local context with respect to one another. Since there is not possibility to validate the measurement data for such a method or a corresponding device, a complete "shift" of the measured target in relation to the device and therefore a measurement error could occur in the measurement.

Preferably a first pulse deflecting unit is used for sending out measurement pulses at different angles, wherein a second pulse deflecting unit is used for receiving reflected measurement pulses at different angles. The first pulse deflecting unit is used to deflect and therefore send out the measurement pulses after emission from the pulse generating unit at different angles. As a result, the pulse generating unit itself need not move to send out the measurement pulses at different angles. The measurement pulses are preferably emitted by the pulse generating unit in one direction, i.e. at an angle but then sent out with the aid of the pulse deflecting unit successively at different angles. In particular, the current angular position of the pulse deflecting unit is determined by means of an angle sensor and included for the distance measurement. The current angular position of the pulse deflecting unit in each case is preferably transmitted in the form of angle signals to an angle sensor. Preferably the distance between two successive angles at which respectively one measurement pulse is sent out is identical. A uniform scanning can therefore take place.

The first pulse deflecting unit preferably comprises a rotatable mirror. In particular, the first pulse deflecting unit rotates at constant speed. Alternatively the entire device can also be rotatable for measuring distances or can have at least one rotatable scan head so that in this way it is possible to send out at different angles. In this case, the rotatable mirror and/or the rotatable device, in particular the rotatable scan head of the device, preferably rotate at constant angular speed. Furthermore, the pulse deflecting unit can comprise other optical units which influence the direction of movement of pulses such as, for example a so-called MEMS mirror, or an electromechanical micro-mirror or a phase-controlled optical element, so-called "phased-array optics" in which pulses are deflected in different directions as a result of a spatial modification of the optical phase. In "phased-array optics" light delivered by a laser source is preferably guided into a plurality of paths on which the corresponding components undergo an individual phase shift. As a result of the subsequent superposition of the various paths influenced in their phases, it can be achieved that radiation only propagates in a certain direction, which can be changed by changing the phases.

Further preferably a second pulse deflecting unit is used for receiving pulses from different angles. In order that the detector itself need not move for detecting the pulses from different angles, the pulses are specifically guided at one angle into the detector but received previously at different angles. Preferably the second pulse deflecting unit receives the pulses from different angles and makes these impinge upon the detector at a fixed angle of incidence. The second pulse deflecting unit preferably comprises a rotatable mirror. Alternatively the detector can be configured in such a manner that despite the fixed position it is able to detect pulses from different angles so that there is no need for a second pulse deflecting unit. The second pulse deflecting unit or the detector preferably rotate at constant angular speed.

Preferably the same pulse deflecting unit, in particular the same mirror is used for sending out the measurement pulses at different angles and for receiving the pulses at different angles. This means that the first and the second pulse deflecting unit are identical. Alternatively the first and the second pulse deflecting unit can be not identical but two independent units wherein the movements thereof are preferably synchronized with one another.

In particular, reflected measurement pulses are received at the second pulse deflecting unit at the angles at which they had previously been sent out at the first pulse deflecting unit. This is therefore logical since after reflection at the target the measurement pulses propagate precisely in opposite directions and it is therefore known that measurement pulses reflected exclusively at the target must impinge again at the same angles. In particular the precise angular position of the pulse deflecting unit upon receipt of a pulse is determined by means of an angle sensor and incorporated for measuring distances.

Preferably trigger signals for the pulse generating unit are generated periodically, i.e. at regular time intervals. A trigger signal is to be understood as a signal which triggers a specific event, here the generation of a measurement pulse. The frequency at which trigger signals are generated is also designated as carrier frequency. In order that the measurement pulses are sent out aperiodically, the receipt, in other words the input or the incidence of the trigger signals at the pulse generating unit is delayed by a delay unit. The resulting delay of a signal is also designated as delay. The trigger signals are preferably generated by the angle sensor. In particular, the angle sensor generates the trigger signals in previously specified angular positions of the first pulse deflecting unit. Preferably trigger signals are generated in constant angular steps wherein one angular step in particular corresponds to the horizontal angular resolution of the pulse deflecting unit. Since the first pulse deflecting unit preferably rotates at constant angular speed, the trigger signals are generated periodically. In particular, these trigger signals are then delayed by means of the delay unit.

Preferably the delay unit receives the trigger signals before these reach the pulse generating unit and relays these delayed to the pulse generating unit. The delay unit in particular takes care to ensure that the trigger signals for the pulse generating unit for generating measurement pulses are delayed and specifically in such a manner that the sending out, more precisely the sending-out times of the measurement pulses takes place aperiodically. For this purpose the trigger signals for the pulse generating unit are delayed by delay times by means of the delay unit. A trigger signal is advantageously delayed in each case by a delay time wherein the delay times vary in such a manner that an aperiodicity of the sending out of the measurement pulses follows. The trigger signals are held back by the delay unit to a certain extent and therefore retarded and only relayed further to the pulse generating unit after a delay time has elapsed. If a single trigger signal is observed, its receipt, more precisely its receiving time is delayed at the pulse generating unit so that the generation of the corresponding measurement pulse and therefore its emission from the pulse generating unit as well as its sending out is delayed by the same delay time in each case. The delay unit can delay all the trigger signals for this purpose and specifically so that an aperiodicity results with varying delay time. It is also possible that the delay unit delays not all but only some of the trigger signals whilst it leaves the other trigger signals uninfluenced.

Alternatively an aperiodic sending out of measurement pulses can be achieved whereby the measurement pulses emitted by the pulse generating unit are delayed with the aid of a delay unit. The delay unit can primarily comprise the first pulse deflecting unit or any other optic at which the emitted measurement pulses are reflected before sending out. The delay is advantageously accomplished by a small angular variation of the per se constant rotation frequency of the delay unit, in particular the first pulse deflecting unit or another optic, for example, by using a step motor. In particular, the pulse deflecting unit rotates at a constant angular speed but small angle variations are allowed so that the measurement pulses are reflected at slightly different times and therefore sent out. However, the sending out is then also accomplished at slightly different angles. In order to nevertheless send out the delayed measurement pulses at the same angle, the pulse repetition rate of the measurement pulses can additionally be varied synchronously to the angular variation of the rotation frequency of the pulse deflecting unit.

Furthermore, the delay unit can be a jitter generator which receives the emitted measurement pulses and relays or sends them out in a delayed manner. The receipt of the trigger signals at the pulse generating unit takes place periodically since the periodically generated trigger signals, as described above, reach the pulse generating unit in an undelayed manner. As a consequence, the measurement pulses are generated and emitted periodically. The periodically emitted measurement pulses are then delayed in such a manner that the measurement pulses are sent out aperiodically. The delay can be accomplished as already implemented above in the description of the delay of the trigger signals.

In order to determine the transit time of the measurement pulse, in particular the sending out of the measurement pulse and the detection of the corresponding reflected measurement pulse are taken into account. In this case, sent-out measurement pulses and reflected measurement pulses then correspond to one another if they have been sent out or received at the same angle. Here the assumption is made that the speed of light is very large compared with the change in the sending-out angle or the angle of the pulse deflecting unit. Therefore an association of a sent-out measurement pulse with its echo as reflected pulse is made by means of the agreement of the sending-out angle and the receiving angle.

In particular, a first and a second timer are used to determine the transit time of the measurement pulse, the respective time measurement of which is started by the trigger signal triggering the measurement pulse, in particular the delayed trigger signal. In other words, the first and the second timer only become active through receipt of a trigger signal. For this purpose preferably a portion of the, in particular delayed, trigger signal is sent to the pulse generating unit to generate a measurement pulse whilst another portion is coupled out in such a manner that this is incident at the first and the second time to activate them. The first timer preferably comprises a start pulse time and the second timer comprises an event pulse timer.

Further preferably a measurement pulse generated by the pulse generating unit is guided as start pulse to the first timer, in particular to a start pulse timer. For this preferably a portion of the measurement pulse is coupled out in the direction of the first timer whereas the other portion is guided in the direction of the target. The start pulse can be an electrical instead of optical pulse. This is preferably coupled out from the current through the pulse generating unit.

The time measurement of the first timer is triggered by the delayed trigger signal. The first timer in particular determines the time between the receipt of the delayed trigger signal at the first timer before receipt of the start pulse at the first timer. The determined time is preferably available as a signal at the output of the first timer for determined distances.

The corresponding reflected measurement pulse is guided as an electrical receiving pulse to a second timer, in particular an event pulse timer, the time measurement thereof is in particular also started by the delayed trigger signal. The receiving pulse is preferably coupled out from the received measurement pulse, in particular by means of the detector. In this case, a plurality of receiving pulses, in particular at least two or three receiving pulses are triggered or coupled out so that a plurality of time measurements are carried out. This is used to ensure a correct time measurement even in cases of interferences, for example due to raindrops on the windscreen.

The second timer preferably measures the time between receipt of the delayed trigger signal at the second timer and the receipt of the receiving pulse at the second timer, which advantageously is present at the output of the second timer. The time between the receipt of the start pulse and the receipt of the receiving pulse can be determined from the two times measured by the timers by taking the difference and the distance to the target at which the measurement pulse was reflected can be determined with the aid of the speed of light. Since the delay of the trigger signal is present in both measured values of the timer, it is cancelled by taking the difference so that it is not absolutely necessary to know the delay of the individual pulses to determine the transit time.

Strictly speaking, the time between the receipt of the start pulse at the first timer and the receipt of the receiving pulse at the second timer is determined by taking the difference. Thus, in the case of different transit times of the signals to the timers it could occur that the difference does not yet reproduce the actual transit time of the measurement pulse. However, this is not critical since the knowledge about the arrangement of the delay unit, which sends out the delayed trigger signal, the pulse generating unit which sends out the start pulse and the detector which sends out the receiving pulses as well as the first and the second timer is provided and consequently any other transit times of the signals to the first and the second timer can be taken into account.

Preferably the first and the second timer constitute two different timers. Furthermore the first and the second timer can be embodied by only one timer which fulfils both the above-described tasks of the first and the second timer.

In the embodiment in which the emitted measurement pulses are delayed, the two timers described above can also be used for the time measurement. The only difference consists in the times which determine the timers. Preferably the trigger signal starts the time measurements of both timers. Since in this embodiment not the trigger signals are delayed but the periodically triggered and emitted measurement pulses, the non-delayed trigger signal starts the measurement of the two timers.

The first timer measures in particular the time between receipt of the undelayed trigger signals at the first timer until receipt of the start pulse at the first timer. The second timer preferably measures the time between receipt of the undelayed trigger signal at the second timer until receipt of the receiving pulse at the second timer. In this case, the start pulse and the receiving pulse are triggered as described above. Since however the emitted measurement pulse is delayed, the time determined by the second timer comprises the delay of the measurement pulse whilst the time determined by the first timer does not comprise the delay so that the delay is not cancelled when taking the difference. When determining the transit time, the delay must be subtracted from the times determined by the timers. Since this is an intentionally enforced delay, the knowledge relating to the delay times is provided so that the transit time and therefore the distance can be readily determined.

Preferably the delay unit delays the trigger signals or the emitted measurement pulses by imprinting a jitter. The term "jitter" is normally to be understood as a non-artificial and non-intentionally produced, naturally occurring frequency variation in the transmission of digital signals which ensures that the transmission times thereof, vary, mostly in an undesired manner. In the present case, the occurrence of a jitter as an effect is desired. Accordingly, the delay unit produces an artificial jitter which is imprinted on the trigger signals or the emitted measurement pulses. The trigger signals or the emitted measurement pulses are intentionally exposed to an artificial jitter which ensures that the sending-out times of the measurement pulses are differently delayed. The actual sending-out times of the measurement pulses are variously strongly delayed by the jitter in relation to the actual sending-out times for the theoretical case that no delay takes place. In other words, the trigger signals or the emitted measurement pulses are intentionally artificially jittered. The delay unit comprises in particular a jitter generator. The delay unit modulates in particular the phase and/or the frequency of the sequence of periodically generated trigger signals to jitter the pulses.

The jitter generator primarily comprises a random generator. This random generator can be implemented in particular by a natural noise source. For example an energized diode can be used to generate a random sequence. In the case of an energized diode, noise is produced at the so-called p-n junction, i.e. the material transition between regions with opposite doping. At regular intervals the amplitude of the noise can be tapped and these analogue signals can be converted into digital values by means of an analogue-digital converter. Thus, a digital random sequence is formed which is based on the random noise of the diode. Another embodiment of the random generator could be based on pseudo-random sequences which can be generated with back-coupled slide registers. Further preferably the jitter generator comprises a unit which imprints the delay on the signals to be delayed, in particular the digital random sequence by means of the random generator is taken as the basis of the trigger signals or the emitted measurement pulses.

In particular, the jitter comprises a statistical jitter. In particular, the delay times produced by the jitter are therefore varied statistically, in particular irregularly with regard to their magnitude. This therefore in particular does not comprise a systematic jitter which would ensure that all the measurement pulses would be uniformly delayed.

Preferably the delay unit generates random sequences from the elements of which a jitter is produced. Thus, the delay as a result of the jitter and therefore the actual sending-out times is varied unpredictably and non-reproducibly for external persons, in particular potential interferers, so that an intentional interference of the method becomes impossible.

In particular, after the duration of a measurement window has elapsed, no more pulses are detected, wherein the jitter has a granularity and this is greater than or equal to the duration of the measurement window. By this means it is achieved that a majority of the interference pulses is incident outside the active measurement window and therefore is not detected at all.

The measurement window comprises a time interval with a duration. This is obtained from the assumption of a maximum permissible measurement distance since when a certain distance between target and device is exceeded, no more detectable reflections from objects can be expected. The duration of the measurement window is obtained from the maximum permissible measurement distance and the speed of light, wherein however the maximum distance is dependent on the reflectivity of the objects. Thus in practice a random value is frequently specified. Usually the measurement is ended after the duration of the measurement window has elapsed so that the detector can no longer detect any pulses.

The granularity of the jitter is to be understood as a step width of the delays triggered by it. The smaller the granularity, the less the delay times differ. The greater the granularity, the more the delay times differ, or scatter. Preferably the granularity corresponds to the duration of at least one measurement window, preferably two, further preferably three measurement windows.

Advantageously the delay times are selected in such a manner that they can lead to significant shifts in the distance measurements. Such a choice of delay times again increases the robustness of the system to interference. In particular, the jitter, preferably the magnitude of the jitter is selected so that the delay times and therefore the time shifts of the actual sending-out times of the measurement pulses with respect to the theoretical undelayed sending-out times lead to significant shifts in distance measurements. The magnitude of the jitter is in this case a measure for how strongly the sending-out times of the pulses are delayed. Accordingly, the larger the jitter, the larger are the imprinted delay times. In particular, the delay times correspond to the duration of at least one measurement window, preferably two, further preferably three measurement windows.

In particular, the pulses detected by the detector comprise measurement pulses and interference pulses since both are detected equally. In this case, interference pulses detected as a result of the aperiodicity of the sending out of the measurement pulses, in particular periodic interference pulses, are distinguished from detected measurement pulses for measuring distances.

The present invention thus makes it possible to detect periodic interference pulses, in particular the method comprises the further step that interference pulses are not taken into account for measuring distances so that the measurement results are not negatively influenced by these. Since the interference pulses are classified as noise, this can be accomplished for example by a suppression of the noise.

In order to detect the interference pulses, in addition to the transit time of a delayed measurement pulse, it is possible to determine the time which has elapsed between the theoretical sending out of the corresponding undelayed pulse and the actual detection of the delayed pulse. This corresponds to the measured transit time of the delayed pulse plus the delay time. It is herewith possible to distinguish specific attacks with regular periodic interference signals from natural noise and thus identify an intentional attack.

The carrier frequency preferably specifies a trigger period. The trigger period designates the time which would lie between two undelayed trigger signals. In particular the delay times are selected in such a manner that these are smaller than the difference between the readout period and the measurement window.

Under a further aspect the invention comprises a device for measuring distances which comprises a pulse generating unit for generating measurement pulses and a detector for detecting at least one measurement pulse reflected by the target. In this case, the device is configured to aperiodically send out measurement pulses for measuring distances. For this purpose the device preferably comprises a delay unit which is configured to delay either the measurement pulses generated by the pulse generating unit or the trigger signals for the pulse generating unit which trigger the measurement pulses in such a manner that the measurement pulses are sent out aperiodically for measuring distances.

Advantageously the device is configured to distinguish as a result of the aperiodicity of the sending out of the measurement pulses for measuring distances, interference pulses detected by the detector, in particular periodic interference pulses, from detected measurement pulses reflected at a target for measuring distances.

In particular, the device comprises a scanning device, advantageously a scanning LIDAR sensor. For this the device comprises a first pulse generating unit, in particular a rotatable mirror, for sending out the measurement pulses at different angles and a second pulse deflecting unit, in particular a rotatable mirror, for receiving reflected measurement pulses from different angles. Preferably the first pulse deflecting unit and the second pulse deflecting unit are identical. Alternatively however, the device can comprise two separate pulse deflecting units, a first and a second.

The delay unit primarily comprises a jitter generator which generates a jitter. The jitter is in particular imprinted on the trigger signals for the pulse generating unit or the emitted measurement pulses. The delay unit can further comprise the first pulse deflecting unit, or any other optic at which the emitted measurement pulses are reflected before sending out.

The device further comprises a first timer and a second timer for determining the transit time of the measurement pulse. In this case, the first timer in particular comprises a start pulse timer and the second timer in particular comprises an event pulse timer. The first and the second timers can be identical or be embodied by two independent components. Advantageously the device comprises elements for coupling out a start pulse for a first timer and elements for coupling out at least one receiving pulse for the second timer. In addition, the device can comprise elements for coupling out signals for activating the timer from the trigger signal for the pulse generating unit.

The device further preferably comprises an angle sensor for triggering trigger signals and for determining the current position of the first pulse deflecting unit. In order to determine the transit time or the time covered by the pulse, the device preferably has an evaluation unit, wherein the first timer and the second timer can be part of the evaluation unit. Furthermore the evaluation unit is configured to identify specific interference attempts with periodic signals. For this the information relating to the current delay is also used in the evaluation unit. The evaluation unit is configured to determine whether received signals are present which are always incident at the same time in relation to the trigger signals. Such signals possibly involve an interference attempt. The evaluation unit receives the information relating to the incidence of the pulses either via the second timer, preferably an event pulse timer or with the aid of a third timer, in particular another event pulse timer which is started by the original trigger signal.

In particular, the device is configured for carrying out the method according to the invention.

BRIEF DESCRIPTION OF THE DRAWINGS

In the figures, schematically.

PREFERRED EMBODIMENTS OF THE INVENTION

Figure 1:
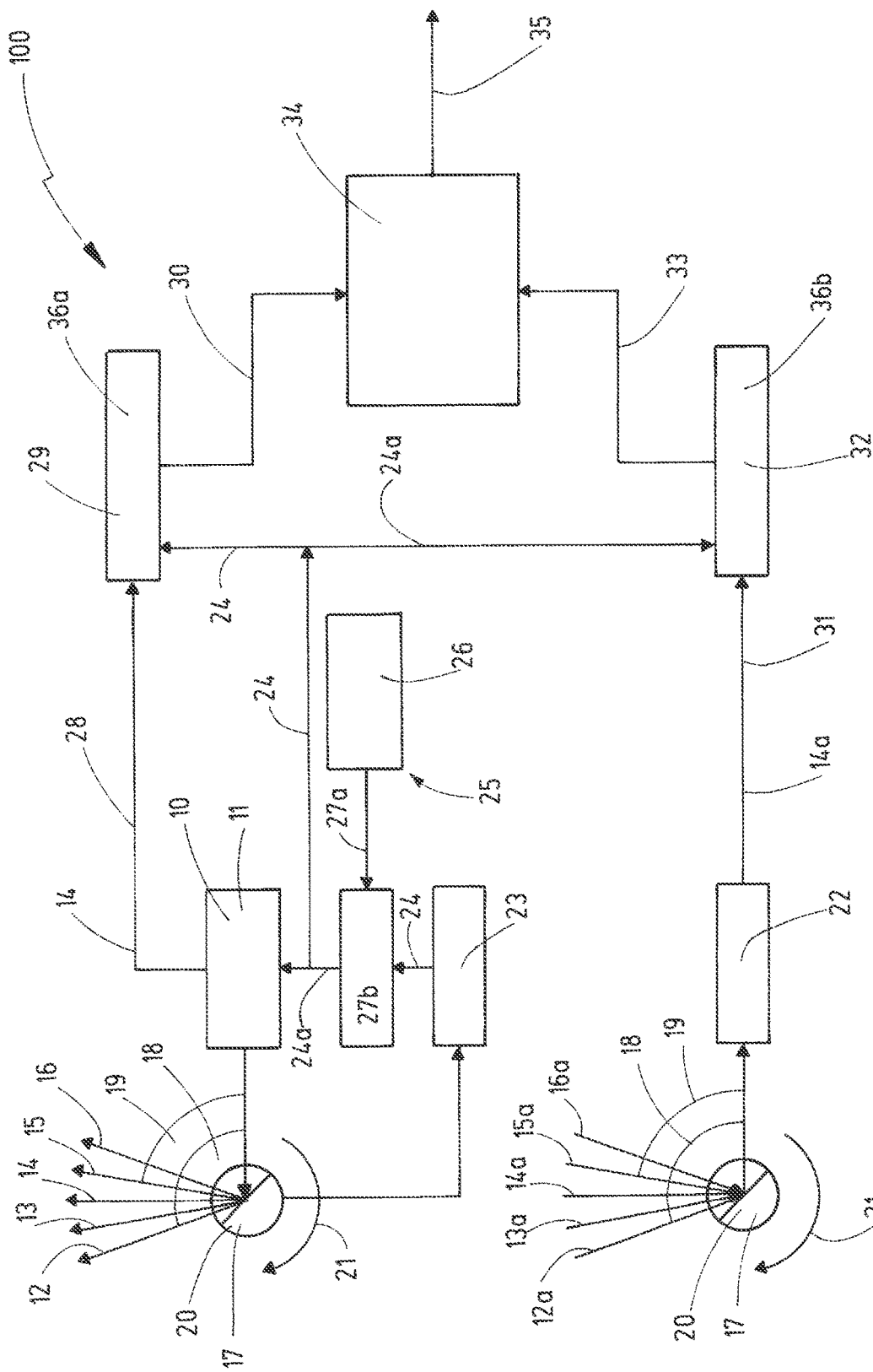
FIG. 1 shows a flow diagram of a method according to the invention.

FIG. 1 shows a flow diagram of a method according to the invention for measuring distances, wherein the arrows shown in FIG. 1 indicate different signals or pulses as well as their directions of propagation. Furthermore FIG. 1 shows a device (100) for measuring distances.

The device (100) for measuring distances comprises as pulse generating unit (10) a laser (11) which emits laser pulses as measurement pulses (12, 13, 14, 15, 16). Furthermore the device (100) has a first pulse deflecting unit (17) for sending out measurement pulses (12, 13, 14, 15, 16) at different angles, of which two angles (18, 19) were depicted as an example in FIG. 1. The first pulse deflecting unit (17) is implemented as a rotatable mirror (20), which rotates at constant rotating frequency in the direction of rotation (21) indicated by the curved arrow. By reflection at the rotating mirror (20), the measurement pulses (12, 13, 14, 15, 16) are sent out into the surroundings of the device (100). Since the measurement pulses (12, 13, 14, 15, 16) are sent out at different angles (18, 19), the device (100) for measuring distances comprises a scanning device (100), in particular a scanning LIDAR sensor.

The measurement pulses (12, 13, 14, 14, 16) are reflected at targets. The measurement pulses (12a, 13a, 14a, 15a, 16a) are received via a second pulse deflecting unit (17) for receiving measurement pulses (12a, 13a, 14a, 15a, 16a) again at different angles of which the two angles (18, 19) are depicted as an example. For this the second pulse deflecting unit (17) rotates at constant rotational frequency in the depicted direction of rotation (21). Reflected measurement pulses (12a, 13a, 14a, 15a, 16a) are received at the same angles at which they had previously been sent out since they merely undergo a reversal of direction during reflection at a target.

The received measurement pulses (12a, 13a, 14a, 14a, 16a) are relayed by the second pulse deflecting unit (17) to a detector (22). The first pulse deflecting unit (17) and second pulse deflecting unit (17) are identical. They are only depicted as separate units in FIG. 1 for better clarity. In the course of this, it is also noted that for better clarity optics for beam focussing are omitted in FIG. 1 for simplicity.

The respectively current angular position of the mirror (21) is determined and decoded by means of an angle sensor (23). In this case, the first pulse deflecting unit (17) transmits corresponding information relating to the angular position to the angle sensor (23). In fixed angular steps wherein one angular step corresponds to the horizontal angular resolution of the first pulse deflecting unit (17), respectively one trigger signal (24) for the laser (11) is generated by means of the angle sensor (23). Since the first pulse deflecting unit (17) rotates at constant rotational frequency, trigger signals (24) are thus generated periodically. The frequency at which the trigger signals (24) are generated is designated as carrier frequency. A trigger signal (24) is depicted representatively in FIG. 1.

The device (100) additionally comprises a delay unit (25) which intercepts the trigger signal (24) from the angle sensor (23) before it reaches the laser (11). The delay unit (25) comprises a jitter generator (26) which imprints a jitter (27a) on the trigger signals (24) so that a delay (27) of the trigger signal (24) is produced. The magnitude of the delay (27), or the delay time, is predefined by the jitter generator (26). The trigger signal (24) is delayed by the delay (27) and continues as delayed trigger signal (24a) in the direction of the laser (11) at which it is also incident in a delayed manner. In this case, a different delay (27) is generated for each trigger signal (24) so that the trigger signals (24) are differently delayed and thus a jitter of the triggers of the laser (11) is obtained.

As soon as the delayed trigger signal (24a) is received at the laser (11), it triggers the generation of a measurement pulse (12, 13, 14, 15, 16) which is coupled out from the laser (11). The measurement pulse (12, 13, 14, 15, 16) then impinges upon the rotating mirror (17) which deflects it into the surroundings of the device (100). The consequence of the different delays of the trigger signals (24) is consequently an aperiodic measurement pulse sequence. Thus, interference which can be produced by imprinting of pulsed external light of the same carrier frequency can be suppressed since this only results in uncorrelated noise measurements.

The determination of the distance will be explained hereinafter for the example of a measurement pulse (14), although the explanations naturally apply to all the measurement pulses (12, 13, 14, 15, 16). The measurement pulse (14) is reflected at a target and detected as reflected measurement pulse (14a). In order to determine the distance to the target, the measurement pulse (14) which is generated and coupled out from the laser is also guided as measured electrical start pulse (28) to a first timer (36a), a start pulse timer (29). This is accomplished by coupling out a portion of the measurement pulse (14) to the start pulse timer. Previously the delayed trigger signal (24a) is guided from the angle sensor (23) to the start pulse timer (29) in order to start the time measurement for the start pulse (28). The start pulse timer (29) determines the time (70) between the receipt of the delayed trigger signal (24a) at the first timer (36a) until receipt of the start pulse (28) triggered by the trigger signal (24) at the first timer (36a) which is available as signal (30) "trigger up to start pulse" at the end of the measurement at the output of the start pulse timer (29) for determining the distance.

In order to determine the transit time of the measurement pulse (14), the received measurement pulse (14a) is prepared electrically in the detector (22) and guided from the detector as electrical receiving pulse (31) to a second timer (36b), an event pulse timer (32). The time measurement of the event pulse timer (32) is started similarly to the start pulse timer (29) previously by the delayed trigger signal (24a) which is guided for this purpose from the angle sensor (23) to the second timer (36b). The second timer (36b) measures the time (71) between the receipt of the delayed trigger signal (24a) and the receipt of the receiving pulse (31) which is triggered when detecting the received measurement pulse (14a). At the output of the event pulse timer (32), after the measurement the signal (33) "trigger up to receiving pulse" is present, which includes the measured time (71).

The time between receipt of the start pulse (28) at the first timer (36a) and receipt of the receiving pulse (31) at the second timer (36b) is determined from the two signals (30) and (33) at the outputs of the first timer (36a) and the second timer (36b), more precisely from the times (70, 71) measured by the first timer (36a) and the second timer (36b), by taking the difference and the distance (35) to the target is determined with the aid of the speed of light. The distance is preferably determined in an evaluation unit (34) of the device (100).

Figure 2:
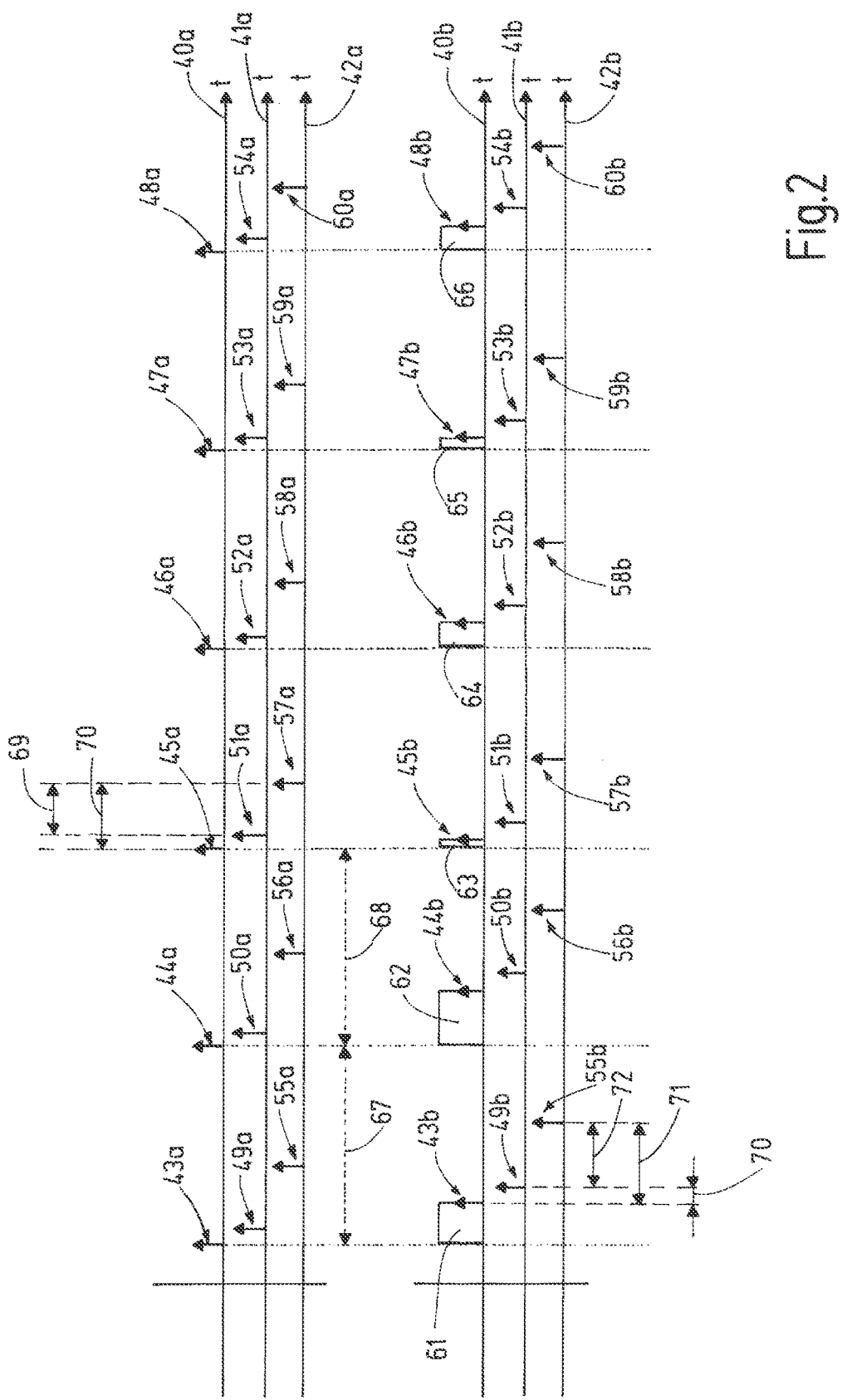
FIG. 2 shows a timing diagram of the pulse sequence of the method according to the invention compared to a method known from the prior art.

FIG. 2 shows a timing diagram relating to the pulse sequence of the method according to the invention compared to a method known from the prior art. The pulses for triggering the generation of a measurement pulse, that is the trigger signals (43a, 44a, 45a, 46a, 47a, 48a, 43b, 44b, 45b, 46b, 47b, 48b) upon receipt at the pulse generating unit as well as the pulses for triggering the time measurement of the two timers (36a, 36b) upon receipt at the respective timers, that is the start pulses (49a, 50a, 51a, 52a, 53a, 54a, 49b, 50b, 51b, 52b, 53b, 54b) and the receiving pulses (55a, 56a, 57a, 58a, 59a, 60a, 55b, 56b, 57b, 58b, 59b, 60b) are shown on time lines (40a, 41a, 42a, 40b, 41b, 42b). The time sequence of the pulses is shown for pulse triplets in each case. In the upper greyed-out region of FIG. 2 it is shown how the pulse behave in the undelayed case known from the prior art. The respective pulses and time lines are identified with an "a", in the lower region of FIG. 2 the pulse sequences are shown in the case according to the invention, wherein the pulses and time lines are each entitled with "b".

The trigger signals (43a, 44a, 45a, 46a, 47a, 48a, 43b, 44b, 45b, 46b, 47b, 48b) upon receipt at the pulse generating unit (10) are shown on the respectively upper time line (40a, 40b) whilst the start pulses (49a, 50a, 51a, 52a, 53a, 54a, 49b, 50b, 51b, 52b, 53b, 54b) upon receipt at the first timer (36a) are shown on the middle time line (41a, 41b) and the receiving pulses (55a, 56a, 57a, 58a, 59a, 60a, 55b, 56b, 57b, 58b, 59b, 60b) upon receipt at the second timer (36b) are shown on the lower time line (42a, 42b). In this case, the time lines running parallel to one another (40a, 41a, 42a, 40b, 41b, 42b) correspond in time so that the time up to a certain point on one of the time lines (40a, 41a, 42a, 40b, 41b, 42b) has elapsed on the other time lines even as far as the respective corresponding points located thereabove or thereunder. Thus, time differences between pulses shown on different time lines can be concluded.

In the undelayed case shown in the upper region of FIG. 2, the receipt of the trigger signals (43a, 44a, 45a, 46a, 47a, 48a) at the pulse generating unit (10) takes place periodically. The frequency of the trigger signals (43a, 44a, 45a, 46a, 47a, 48a) is designated as carrier frequency. The relevant time interval in each case, which is obtained by inverting the carrier frequency, is designated as trigger time which is also constant. As an example, two identical trigger times (67, 68) are depicted. As soon as the trigger signals (43a, 44a, 45a, 46a, 47a, 48a) are received at the pulse generating unit (10), they trigger the generation of measurement pulses, wherein these are coupled out as start pulses (49a, 50a, 51a, 52a, 53a, 54a) in the direction of a first timer.

Since there is no delay in the receipt of the trigger signals (43a, 44a, 45a, 46a, 47a, 48a) at the pulse generating unit, the generation of the measurement pulses, their emission by the pulse generating unit and therefore also the generation of the start pulses (49a, 50a, 51a, 52a, 53a, 54a) also takes place periodically. The distance between a trigger signal (43a, 44a, 45a, 46a, 47a, 48a) and the corresponding start pulse (49a, 50a, 51a, 52a, 53a, 54a) is identical in each case.

The measurement pulses triggered by the trigger signals (43a, 44a, 45a, 46a, 47a, 48a) are sent out in different directions at different angles. In the present case, the measurement pulses are reflected at the same target so that their transit times do not differ to an approximation. Thus, at regular intervals with respect to the start pulses (49a, 50a, 51a, 52a, 53a, 54a) or trigger signals (43a, 44a, 45a, 46a, 47a, 48a) receiving pulses (55a, 56a, 57a, 58a, 59a, 60a) are produced, which are triggered by the detection of the respective reflected measurement pulses. A distance (70) between a trigger signal (45a) and the corresponding receiving pulse (57a) and a distance (69) between a start pulse (51a) and the receiving pulse (57a) are depicted as an example in the upper region of FIG. 2.

Since such a measurement method can be seen through very easily due to the periodicity of the trigger signals (43a, 44a, 45a, 46a, 47a, 48a) and therefore the sending out of the measurement pulses and the triggering of the start pulses (49a, 50a, 51a, 52a, 53a, 54a), it can be easily interfered with, in particular specifically by generating interference pulses having the same carrier frequency as the trigger signals (43a, 44a, 45a, 46a, 47a, 48a) which can only be distinguished with difficulty from the actual measurement pulses by the method for measuring distances or the device for measuring distances and thus result in measurement errors.

In the present method whose pulse sequence is shown in the lower part of FIG. 2, the respective receipt of the trigger signals (43b, 44b, 45b, 46b, 47b, 48b) at the pulse generating unit is delayed by delay times (61, 62, 63, 64, 65, 66). In this case, the delay times (61, 62, 63, 64, 65, 66) differ so that the trigger signals (43b, 44b, 45b, 46b, 47b, 48b) are delayed to different extents. As a consequence, the distance between the receipt of two successive trigger signals (43b, 44b, 45b, 46b, 47b, 48b) at the pulse generating unit is not constant. The measurement pulses triggered by the trigger signals (43b, 44b, 45b, 46b, 47b, 48b) and the start pulses (49b, 50b, 51b, 52b, 53b, 54b) for the first timer are generated aperiodically. The first timer measures the time (80) between the receipt of the delayed trigger signal (43b) and the receipt of the start pulse (49b), wherein the second timer measures the time (81) between the receipt of the delayed trigger signal (43b) and the receipt of the receiving pulse (55b), both are shown as an example for a pulse sequence in the lower region of FIG. 2. The transit time (82) of the measurement pulse and from this the distance to the target at which the measurement pulse was reflected can be determined from the difference in the two times (80, 81). As a result of the aperiodicity of the delayed trigger signals, the method is considerably less prone to failure with respect to, in particular periodic, interference pulses in contrast to the method known from the prior art. In particular, the method can no longer be intentionally interfered with from outside by synchronization of a periodic interference signal at the carrier frequency.

REFERENCE LIST

100 Device for optically measuring distances
10 Pulse generating unit
11 Laser
12, 13, 14, 15, 16 Measurement pulses
12a, 13a, 14a, 15a, 16a Reflected measurement pulses
17 First and second pulse deflecting unit
18, 19 Angle
20 Mirror
21 Direction of rotation of mirror
22 Detector
23 Angle sensor
24 Trigger signal
24a Delayed trigger signal
25 Delay unit
26 Jitter generator
27a Jitter
27b Delay
28 Start pulse
29 Start pulse timer
30 Signal "Trigger as far as start pulse"
21 Receiving pulse
32 Event pulse timer
33 Signal "trigger as far as receiving pulse"
34 Evaluation unit
35 Distance to target
36a, 36b First timer, second timer
40a, 41a, 42a, 40b, 41b, 42b Time lines
43a, 44a, 45a, 46a, 47a, 48a, Trigger signals
43b, 44b, 45b, 46b, 47b, 48b
49a, 50a, 51a, 52a, 53a, 54a, Start pulses
49b, 50b, 51b, 52b, 53b, 54b
55a, 56a, 57a, 58a, 59a, 60a, Receiving pulses
55b, 56b, 57b, 58b, 59b, 60b
61, 62, 63, 64, 65, 66 Delay times
67, 68 Trigger time
69 Transit time of the measurement pulse without delay
70 Time between the undelayed trigger signal and the corresponding receiving pulse
80 Time between receipt of the delayed trigger signal and receipt of the start pulse signal
81 Time between receipt of the delayed trigger signal and receipt of the receiving pulse
82 Transit time of the measurement pulse

The invention claimed is:

1. A method for optically measuring distances comprising:
   wherein a plurality of measurement pulses is emitted by means of a pulse-generating unit,
   wherein the emitted measurement pukes are sent out to measure distances,
   wherein at least one sent-out measurement puke is reflected by a target in the form of a reflected measurement pulse,
   wherein the measurement pulse reflected by the target is detected by means of a detector,
   wherein the transit time of the measurement pulse to the target is determined,
   wherein the distance covered by the measurement pulse to the target is determined with the aid of the speed of light,
   wherein the measurement pulses for measuring distances are sent out aperiodically,
   wherein trigger signals for the pulse generating unit are periodically generated,
   wherein the trigger signals trigger the emission of measurement pulses,
   wherein the reception of the trigger signals at the pulse generating unit or the emitted measurement pulses is delayed by means of a delay unit in such a manner that the measurement pulses for measuring distances are sent out aperiodically, wherein the trigger signals for the pulse generating unit or the emitted measurement pulses are delayed by imprinting a jitter, in particular a statistical jitter, wherein a granularity of the jitter is at least the duration of a measurement window, and wherein the granularity of the jitter is to be understood as a step width of the delays triggered by it.

2. The method for optically measuring distances according to claim 1, wherein sent-out measurement pulses are sent out at different angles and that reflected measurement pulses are received at different angles, and wherein in particular a first pulse deflecting unit is used for sending out measurement pukes at different angles, wherein in particular a second puke deflecting unit is used for receiving reflected measurement pukes from different angles.

3. The method for optically measuring distances according to claim 1, wherein the transit time of the measurement pulse is determined by means of a first timer and a second timer, and wherein the time measurement of the first timer and the time measurement of the second timer is started by the trigger signal triggering the measurement pulse.

4. The method for optically measuring distances according to claim 1, wherein after the duration of a measurement window has elapsed, no more pulses are detected.

5. The method for optically measuring distances according to claim 1, wherein delay times generated by means of the delay unit are selected in such a manner that the delay time corresponds to at least the duration of a measurement window so that the delay times result in significant shifts in the distance measurement.

6. The method for optically measuring distances according to claim 1, wherein the detector detects pulses, wherein the pukes detected by the detector comprise reflected measurement pukes and interference pulses, wherein as a result of the aperiodicity of the emission of the measurement pulses for measuring distance, detected interference pulses, in particular periodic interference pulses, are distinguished from detected measurement pulses reflected at a target for measuring di stances.

7. The method for optically measuring distances according to claim 1, wherein in order to distinguish measurement pulses and interference pulses, the time between the sending out of a non-delayed measurement puke and the detection of the appurtenant delayed reflected measurement pulse is determined.

8. A Device for optically measuring distances, comprising:

a pulse generating unit for generating measurement pulses and a detector for detecting at least one measurement pulse reflected by the target, wherein the device is configured to send out the measurement pulses aperiodically for measuring distances, wherein the device is configured for carrying out the method of claim 1.

9. The device for optically measuring distances according to claim 8, wherein the device comprises a delay unit, wherein the delay unit is configured to delay the measurement pukes emitted by the puke generating unit or the trigger signals triggering the measurement pulses for the pulse generating unit in such a manner that the measurement pulses for measuring distances are sent out aperiodically.

10. The device for optically measuring distances according to claim 8, wherein the device is configured as a result of the aperiodicity of the sending out of the measurement pulses for measuring distances, to distinguish interference pulses detected by the detector, in particular periodic interference pulses, from detected measurement pulses reflected at the target for measuring distances.

11. The device for optically measuring distances according to claim 8, wherein the device comprises a first pulse deflecting unit, in particular a rotatable mirror, for sending out the measurement pulses at different angles, wherein the device further comprises a second pulse deflecting unit, in particular a rotatable mirror, for receiving reflected measurement pulses from different angles, and wherein the first pulse deflecting unit and the second pulse deflecting unit are in particular identical.

12. The device for optically measuring distances according to claim 9, wherein the delay unit is a jitter generator or a first pulse deflecting unit.

* * * * *